United States Patent
Lang et al.

(10) Patent No.: US 12,273,353 B2
(45) Date of Patent: Apr. 8, 2025

(54) REMOTE AUTHENTICATION AND LOCAL CONTROL OF ENTERPRISE DEVICES

(71) Applicant: Xerox Corporation, Norwalk, CT (US)

(72) Inventors: Joseph H. Lang, Webster, NY (US); Timothy L. Dioguardi, Webster, NY (US); Fadi G. Rouhana, Fairport, NY (US); Paul F. Brown, II, Webster, NY (US); Scott C. Van Scooter, Chatham, IL (US)

(73) Assignee: Xerox Corporation, Norwalk, CT (US)

( * ) Notice: Subject to any disclaimer, the term of this patent is extended or adjusted under 35 U.S.C. 154(b) by 435 days.

(21) Appl. No.: 17/655,342

(22) Filed: Mar. 17, 2022

(65) Prior Publication Data

US 2023/0300142 A1    Sep. 21, 2023

(51) Int. Cl.
*G06F 21/45* (2013.01)
*H04L 9/40* (2022.01)

(52) U.S. Cl.
CPC ........... *H04L 63/108* (2013.01); *G06F 21/45* (2013.01); *H04L 63/083* (2013.01)

(58) Field of Classification Search
CPC . H04L 63/108; H04L 63/083; H04L 63/0846; H04L 63/107; G06F 21/45; G06F 21/608; H04W 12/065
See application file for complete search history.

(56) References Cited

U.S. PATENT DOCUMENTS

| | | | |
|---|---|---|---|
| 10,027,841 B1 * | 7/2018 | Kodimer | H04N 1/00344 |
| 2006/0190411 A1 * | 8/2006 | Gava | G06Q 10/10 |
| | | | 705/64 |
| 2009/0228962 A1 * | 9/2009 | Pathak | G06F 21/6209 |
| | | | 726/5 |
| 2011/0197267 A1 | 8/2011 | Gravel et al. | |
| 2015/0055161 A1 * | 2/2015 | Allison | H04L 63/0853 |
| | | | 358/1.13 |
| 2015/0347884 A1 * | 12/2015 | Kodimer | G06F 3/123 |
| | | | 358/1.13 |
| 2017/0223010 A1 | 8/2017 | Wilkinson et al. | |
| 2022/0060597 A1 * | 2/2022 | Adachi | H04N 1/00244 |

FOREIGN PATENT DOCUMENTS

| CN | 2008100071478 A | 2/2008 |
|---|---|---|
| CN | 201410542741.2 A | 10/2014 |

OTHER PUBLICATIONS

Konica-Minolta manual, downloaded from https://manuals.konicaminolta.eu/bizhub-C554-C454-C364-C284-C224/EN/contents/id08-0369.html on Jul. 26, 2022.
U.S. Appl. No. 17/517,710, filed Nov. 3, 2021.

* cited by examiner

*Primary Examiner* — Amie C. Lin (57) ABSTRACT

An enterprise owned multi-function device (MFD) is disclosed. For example, the MFD includes, a communication interface to establish a communication session with an authentication server, a re-activation timer, a processor and a non-transitory computer readable medium storing instructions, which when executed by the processor, cause the processor to authenticate the enterprise owned MFD over the communication session when the enterprise owned MFD is activated at a remote location of an employee, create a local account of the employee for local authentication, and authorize access to the employee via the local account of the employee until the re-activation timer expires.

20 Claims, 5 Drawing Sheets

REMOTE AUTHENTICATION AND LOCAL CONTROL OF ENTERPRISE DEVICES

The present disclosure relates generally to enterprise owned devices and relates more particularly to providing remote authentication and local control of the enterprise devices at a remote location.

BACKGROUND

Enterprises can have a variety of different devices that can be used by employees. For example, various devices can be at an enterprise location to help improve the productivity of the employees. For example, enterprises may have large printers or multi-function devices (MFDs) that can be shared by employees at an office location.

MFDs are devices that can perform a variety of different functions. The MFDs can provide a variety of different options to perform various job requests, such as different colors, different paper sizes, changing a print quality, changing a size of an image and/or text to be printed, stapling, collating, providing different email addresses, selecting which network storage service to which to send a scanned document, and the like.

SUMMARY

According to aspects illustrated herein, there are provided an enterprise owned multi-function device (MFD) and a method for authenticating and controlling the enterprise owned MFD. One disclosed feature of the embodiments is an enterprise owned MFD that comprises a communication interface to establish a communication session with an authentication server, a re-activation timer, a processor and a non-transitory computer readable medium storing instructions, which when executed by the processor, cause the processor to authenticate the enterprise owned MFD over the communication session when the enterprise owned MFD is activated at a remote location of an employee, create a local account of the employee for local authentication, and authorize access to the employee via the local account of the employee until the re-activation timer expires.

Another disclosed feature is a method for authenticating and controlling an enterprise owned MFD. The method executed by a processor of the enterprise owned MFD comprises detecting activation, transmitting a request for authentication of an employee in response to the activation, receiving a confirmation of authentication of the employee, creating a local account of the employee for local authentication, and authorizing access of the enterprise owned MFD to the employee via the local account of the employee until a re-activation timer expires.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses enterprise owned MFDs that can be configured for remote authentication and local control at an employee location and methods for performing the same. As discussed above, enterprises can have a variety of different devices that can be used by employees. For example, various devices can be at an enterprise location to help improve the productivity of the employees. For example, enterprises may have large printers or multi-function devices (MFDs) that can be shared by employees at an office location.

However, as more employees begin to work remotely from home, the employees may not have access to these enterprise MFDs that are shared in the office location. The employees may still need access to the job functions and features at their home office while working remotely.

MFDs may be relatively expensive devices, and employees may not want to pay for their own MFDs. Enterprises may not want to provide enterprise owned MFDs to the employees without restrictions. Otherwise, other family members in the employees' homes may use the MFDs and drive up usage and maintenance costs for the MFDs.

The present disclosure provides MFDs that can be configured to allow an enterprise to remotely authenticate use of the MFDs at the employees' remote locations. The MFDs may also be configured to locally control authentication after the MFDs are initially activated and authenticated with the enterprises. Thus, the MFDs may prevent unauthorized family members from using the MFDs and limit use of the MFDs to the employees.

In addition, the MFDs may include a de-activation timer. When the de-activation timer expires, the associated MFD may be de-activated, and a notification may be transmitted to the associated enterprise for pick up. The enterprise may then send a logistics courier to the employee's location to pick up the MFD when no longer needed by the employee or if the employee is returning to the office regularly.

Figure 1:
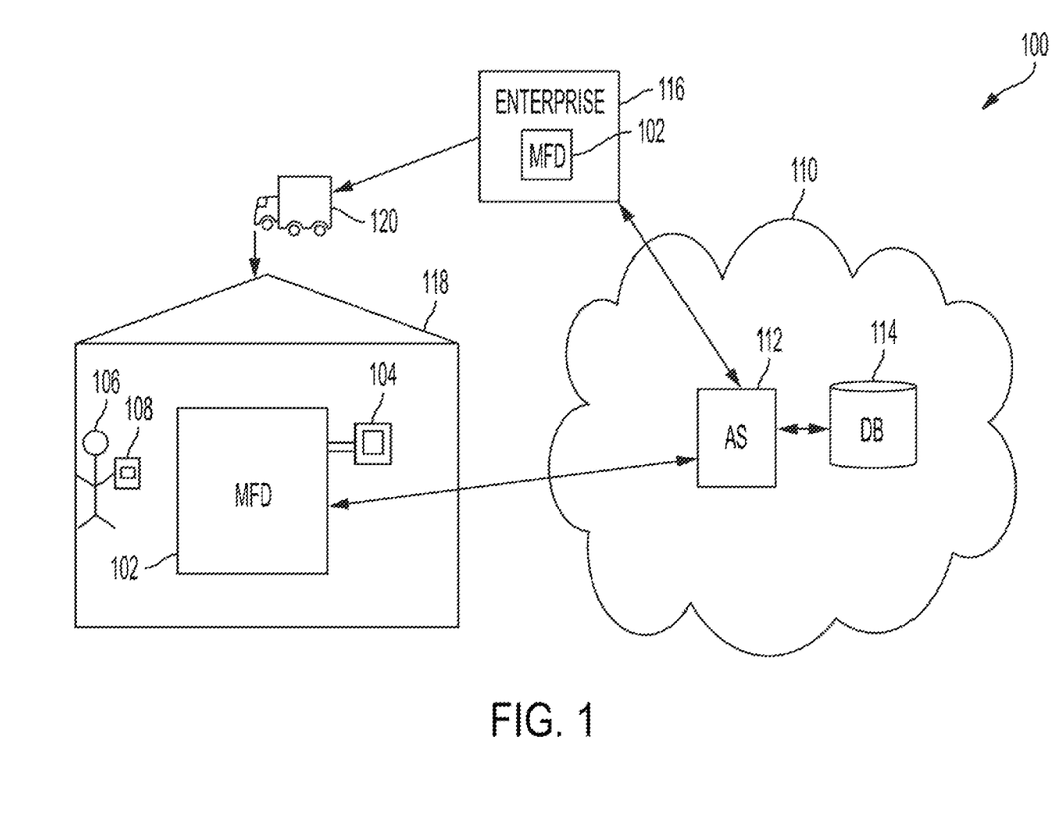
FIG. 1 illustrates an example network that includes an enterprise owned MFD with remote authentication and local control at an employee location.

FIG. 1 illustrates an example network 100 of the present disclosure. The network 100 may include a home 118 of an employee 106, an enterprise location 116, and an internet protocol (IP) network 110. In one embodiment, the IP network 110 may include an authentication server (AS) 112 and a database (DB) 114. The AS 112 may also be referred to as the remote server or authentication server. The AS 112 may perform remote authentication of a multi-function device (MFD) 102, as described in further detail below.

In one embodiment, the DB 114 may store authentication information for each MFD 102 that is sent to a remote location. The AS 112 may perform authentication by matching authentication information received from the employee 106 via the MFD 102 to the authentication information stored in the DB 114 that was registered by the enterprise 116 when the MFD 102 was configured.

It should be noted that the IP network 110 has been simplified for ease of explanation and may include additional network elements or devices that are not shown. For example, the IP network 110 may include additional gateways, firewalls, access networks, routers, switches, and the like.

In one embodiment, the enterprise 116 may be a company that owns the MFD 102. The enterprise 116 may allow the employee 106 to work remotely from the employee's home 118. As noted above, the employee 106 may want access to the MFD 102 for productivity. The MFD 102 may be relatively expensive to own and maintain. For example, replacement ink or toner for the MFD 102 may be expensive, as well as paper and overall maintenance. Thus, the enterprise 116 may not want the MFD 102 to be accessed for personal use by other family members in the home 118 who may drive up the overall costs to operate and maintain the MFD 102 at a remote location.

In one embodiment, the enterprise 116 may configure or modify the MFD 102 to enable remote administration with a self-managed account ability. For example, the enterprise 116 may create and load a configuration file that may perform the functions described herein on the MFD 102. The enterprise 116 may also add a de-activation timer to the MFD 102, a global positioning system (GPS) radio to the MFD 102, and the like. The configuration file may allow the MFD 102 to be remotely authenticated when activated at the home 118 of the employee 106. Once authenticated, the configuration file may create a local account for the employee 106 and limit access to the MFD 102 to the employee 106.

After the MFD 102 is configured by the enterprise 116, a courier 120 may deliver the enterprise owned MFD 102 to the home 118 of the employee 106. The employee 106 may then activate the MFD 102. When the enterprise owned MFD 102 is activated in the employee's home 118, the employee 106 may provide authentication information of the employee's account with the enterprise 116 via the user interface 104 of the MFD 102. The authentication information may be transmitted to the AS 112 via the IP network 110. The AS 112 may perform the authentication.

In one embodiment, the MFD 102 may also transmit GPS coordinates to the AS 112. This may ensure that the enterprise owned MFD 102 was delivered to the correct address of the employee 106 and that another user is not attempting to use the enterprise owned MFD 102. In addition, the GPS coordinates may ensure that the employee 106 is not taking the enterprise owned MFD 102 to another location or allowing another family member to "borrow" the enterprise MFD 102.

In one embodiment, the GPS coordinates may also be provided to the MFD 102 from a mobile endpoint device 108. For example, if the MFD 102 is not equipped with a GPS radio or the GPS radio of the MFD 102 is malfunctioning, the mobile endpoint device 108 may provide the GPS coordinates to the MFD 102 to be transmitted to the AS 112.

After the employee 106 is authenticated, the AS 112 may also transmit customized settings to the MFD 102. For example, the employee 106 may have customized user interfaces, workflows, authorized features, and the like. For example, the employee 106 may have a customized user interface with icons arranged in a certain order or location on the user interface 104. The employee 106 may have custom workflows that have been pre-programmed to allow the employee 106 to select a single icon to execute multiple steps for a particular job request on the MFD 102.

In addition, the configuration file loaded onto the MFD 102 may prompt the employee 106 to create a local account via the user interface 104. The local account may perform local authentication on the MFD 102 without having to communicate with the AS 112 each time the employee 106 wants to use the MFD 102.

The local account may also allow the employee 106 to select desired authorization methods. For example, the employee 106 may create a local account using a username and password or create an authorization associated with a proximity card, a mobile endpoint device 108 of the employee, and the like. For example, rather than entering a local username and password on the user interface 104, the employee 106 may be able to scan a proximity card or transmit authorization information from the mobile endpoint device 108 to access the MFD 102.

In one embodiment, once the enterprise owned MFD 102 is activated and authenticated, a re-activation timer and a de-activation timer may be activated. The re-activation timer may control a time limit that controls how frequently the employee 106 may be required to re-authenticate the MFD 102. For example, the re-activation timer may be one week, one month, six months, one year, and the like. When the re-activation timer expires, the employee 106 may be required to re-authenticate the MFD 102 with the AS 112, as described above.

The de-activation timer may control a time limit that controls how much time after expiration of the re-activation timer the employee 106 has to perform the re-authentication. For example, the de-activation timer may expire 24 hours after expiration of the re-activation timer, 1 week after expiration of the re-activation timer, 1 month after expiration of the re-activation timer, and the like. If the employee 106 fails to perform the re-authentication before the de-activation timer expires, the MFD 102 may be deactivated, and a notification may be transmitted to the enterprise 116 to pick up the MFD 102 from the home 118 of the employee 106. Once the re-authentication is performed, the re-activation timer and the de-activation timer may be reset.

When the re-activation timer expires, the employee 106 may request additional time to reset the re-activation timer. For example, the employee 106 may send a request to the enterprise 116 as part of the re-authentication process. If approved, the enterprise 116 may transmit a control signal to the AS 112 to have the AS 112 send a control signal to the MFD 102 to reset the re-activation timer.

If the additional time is not approved, the MFD 102 may transmit a notification to the enterprise 116 (e.g., via the AS 112, an email, or any other type of communication). The MFD 102 may then delete all local accounts of the employee and deactivate itself. The enterprise 116 may then schedule the courier 120 to pick up the MFD 102 from the home 118 of the employee 106.

Figure 2:
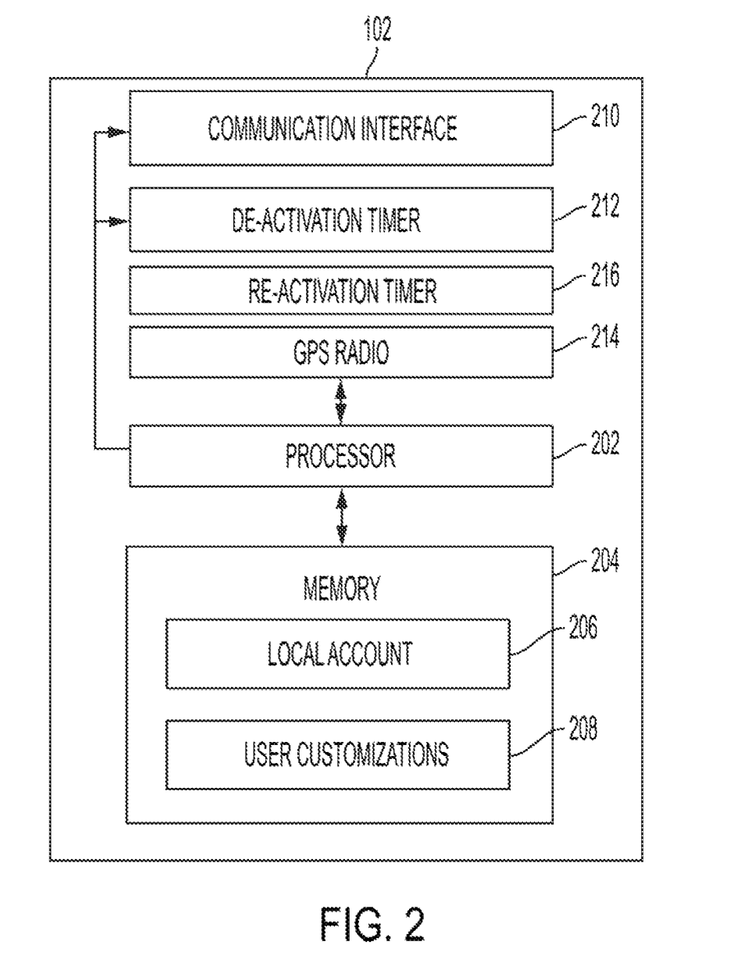
FIG. 2 illustrates a block diagram of an example MFD of the present disclosure.

FIG. 2 illustrates a block diagram of an example MFD 102 illustrated in FIG. 1. In one embodiment, the MFD 102 may include a processor 202, a memory 204, a communication interface 210, a de-activation timer 212, a re-activation timer 216, and a GPS radio 214. The processor 202 may be communicatively coupled to the memory 204, the communication interface 210, de-activation timer 212, the re-activation timer 216, and the GPS radio 214. The processor 202 may control operation of the communication interface 210, the de-activation timer 212, the re-activation timer 216, and the GPS radio 214. The processor 202 may receive and/or transmit authorization or authentication information via the communication interface 210.

In one embodiment, the communication interface 210 may be to establish a communication path between the MFD 102 and the AS 112 via the IP network 110. For example, the communication interface 210 may be a wireless or wired communication interface. For example, the communication interface 210 may be a WiFi radio, an Ethernet connection, a fax over IP connection that uses an RJ-111 connection, a cellular radio, and the like.

The re-activation timer 216 may include an internal clock. The re-activation timer may include a preset amount of time that is set by the enterprise 106 (e.g., a configuration file loaded on the MFD 102). The re-activation timer 216 may count up to the present amount of time or may count down the preset amount of time using the internal clock. The re-activation timer 216 may begin when the MFD 102 has been successfully authenticated by the employee 106 after delivery. The re-activation timer 216 may control when and/or how frequently the employee 106 may be required to perform re-authentication to confirm that the employee 106 is still actively using the MFD 102.

The de-activation timer 212 may include an internal clock. The de-activation timer 212 may include a preset amount of time that is set by the enterprise 106 (e.g., a configuration file loaded on to the MFD 102). The de-activation timer 212 may count up to the preset amount of time or may count down the preset amount of time using the internal clock. The de-activation timer 212 may begin once the re-activation timer 216 expires. The de-activation timer 212 may control an amount of time the employee 106 has to perform the re-authentication before the MFD 102 is deactivated.

The GPS radio 214 may provide location information. For example, the GPS radio 214 may provide latitude and longitude coordinates. In another example, the GPS radio 214 may translate the coordinates and provide an address of the location (e.g., the address of the home 118 of the employee 106).

In one embodiment, the memory 204 may be any type of non-transitory computer readable medium. For example, the memory 204 may be a hard disk drive, a solid state drive, a random access memory, a read only memory, and the like. The memory 204 may store instructions that are executed by the processor 202 to perform the functions described herein. For example, the instructions may cause the processor 202 to perform operations of the method 300 illustrated in FIG. 3 or the method 400 illustrated in FIG. 4, and discussed in further detail below.

In one embodiment, the memory 204 may store a local account 206 and user customizations 208. In one embodiment, the local account 206 may include authorization or authentication information for local authentication by the MFD 102 of the employee 106. The local account 206 may include a username and password. In one embodiment, the local account 206 may include authorizations associated with devices of the employee 106. For example, the local account 206 may include authorizations associated with a proximity card, a mobile endpoint device, and the like. The local account 206 may include a token or key that is stored in the proximity card or mobile endpoint device. The proximity card or mobile endpoint device can be scanned to read the stored token or key to see if it matches the token or key stored in the local account 206 for authentication.

In one embodiment, the user customizations 208 may include custom user interface settings, custom workflows, and the like, as described above. In one embodiment, the user customizations 208 may be transmitted to the MFD 102 from the AS 112 after the MFD 102 is authorized remotely. In one embodiment, the user customizations 208 may be stored in memory 204 when the enterprise configures the MFD 102 for delivery to the employee 106. The user customizations 208 may be locked until the MFD 102 is remotely authenticated or authorized. Once authorized, the MFD 102 may load the user customizations 208.

Figure 3:
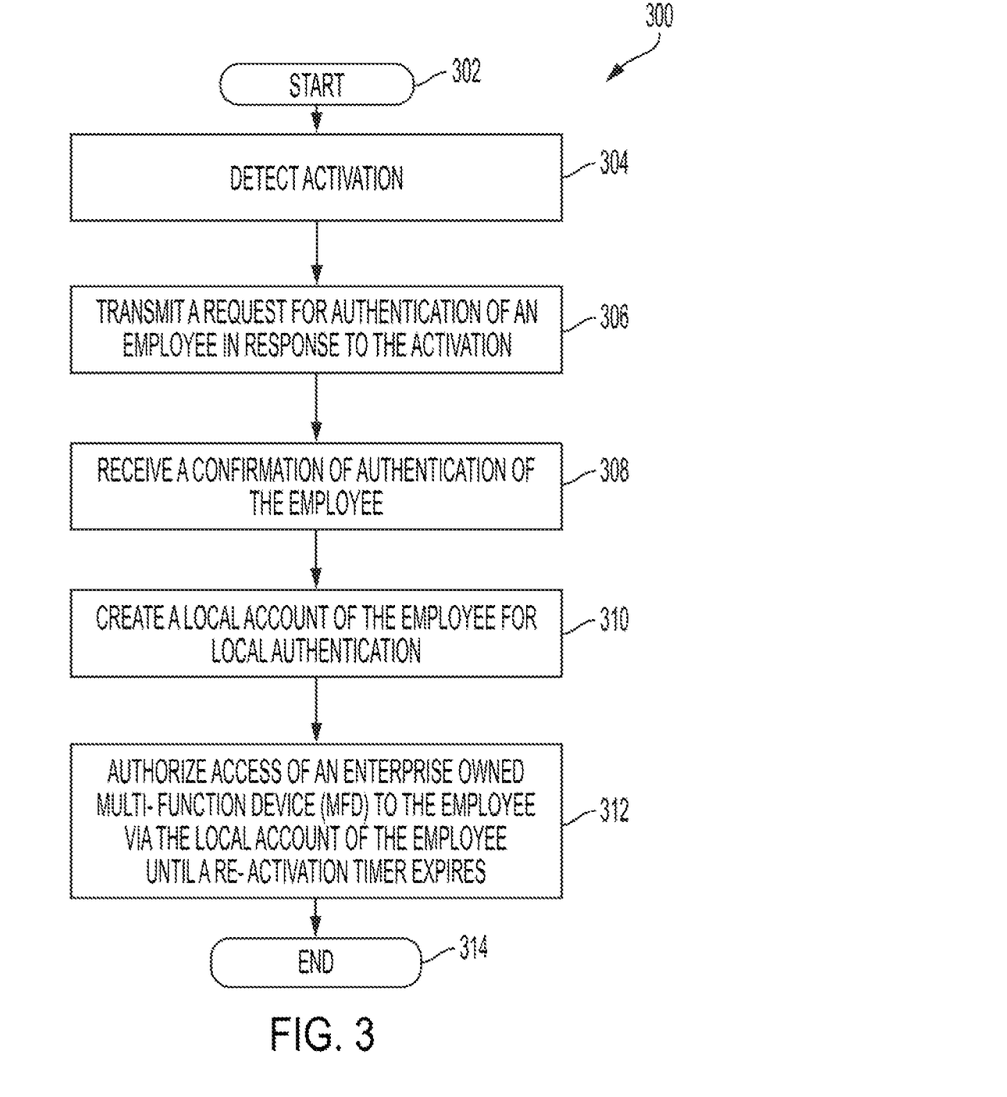
FIG. 3 illustrates a flow chart for a method of authenticating and controlling an enterprise owned MFD at an employee location of the present disclosure.

FIG. 3 illustrates a flow chart of an example method 300 for authenticating and controlling an enterprise owned MFD at an employee location of the present disclosure. In one embodiment, the method 300 may be performed by the apparatus 102 or by an apparatus such as the apparatus 500 illustrated in FIG. 5 and discussed below.

In one embodiment, the method 300 begins at block 302. At block 304, the method 300 detects activation. For example, an employee may receive the enterprise owned MFD at the employee location (e.g., the employee's home) and power on the MFD. The employee may start the operating system software and make the appropriate wireless or wired connections to the communication interface of the MFD. When the MFD is ready for operation and connected to the network, the MFD may detect that it has been powered on or activated and is now ready to start the authentication/authorization process.

At block 306, the method 300 transmits a request for authentication of an employee in response to the activation. For example, the MFD may prompt the employee for an enterprise username and password (e.g., a username and password assigned by the enterprise 116 to access accounts and/or networks associated with the enterprise 116). The employee may enter his or her enterprise username and password, and the information may be transmitted to an authentication server.

In one embodiment, additional authentication information may be transmitted with the request. For example, the MFD may have a GPS radio that can detect a location of the MFD. The MFD may also transmit GPS location information to confirm that the MFD is at the location it is intended for. For example, transmitting the GPS location information may allow for detection of cases in which the MFD was delivered to a wrong address and an unauthorized user is trying to access use of the MFD, or cases in which the employee has moved the MFD to another location other than the home of the employee.

At block 308, the method 300 receives a confirmation of authentication of the employee. For example, the authentication server may match the enterprise username and password and/or any other authentication information that was transmitted with authentication information stored at the authentication server (e.g., a database that stores authentication information for all employees that will be receiving an enterprise owned MFD). If a match is found, the authentication server may send a confirmation of authentication.

In one embodiment, the confirmation may be a control signal from the authentication server 112 that unlocks the MFD for use. For example, the MFD may be unusable until the control signal is received from the authentication server 112 in response to authenticating the employee that received the MFD.

At block 310, the method 300 creates a local account of the employee for local authentication. In one embodiment, the MFD may prompt the employee to create a local account on the MFD. The local account may allow the MFD to perform local authentication after the initial authentication with the authentication server is performed.

The local account may also allow the employee to customize how the employee would like to perform the local authentication. For example, the local account may be set up to enter a username and password. In another example, the local account may be set up to allow the employee to scan a proximity card or provide a token or key from a mobile endpoint device, and the like.

In one embodiment, when the MFD is authenticated, the MFD may also be configured with customizations associated with the employee. As described above, the employee may have user customizations such as a customized user interface, customized workflows, and the like. The user customizations may be pre-loaded in memory or transmitted from the authentication server as part of the authentication notification.

At block 312, the method 300 authorizes access of an enterprise owned MFD to the employee via the local account of the employee until a re-activation timer expires. As described above, the MFD may include a re-activation timer and a de-activation timer. The re-activation timer may be started when the MFD is activated and authenticated. The employee may access the enterprise owned MFD until the re-activation timer expires.

If the re-activation timer expires, the employee may be required to re-authenticate the MFD. The employee may request additional time from the enterprise as part of the re-authentication process. The enterprise may then instruct the authentication server to transmit a control signal to the MFD to restart the re-activation timer.

In one embodiment, when the re-activation timer expires, the de-activation timer may begin to count down. The de-activation timer may provide a time limit to require the employee to perform the re-authentication process. If the de-activation timer expires, the MFD may be deactivated. If the user begins the re-authentication process, the de-activation timer may be reset.

If additional time is not granted to the employee, the MFD may delete all local accounts of the employee, delete all customized settings, and transmit a notification to the authentication server to schedule a pick-up of the enterprise owned MFD from the remote location of the employee (e.g., the home of the employee). The enterprise owned MFD may then deactivate itself until it is returned to the enterprise for re-configuration to be sent to another employee. At block 314, the method 300 ends.

Figure 4:
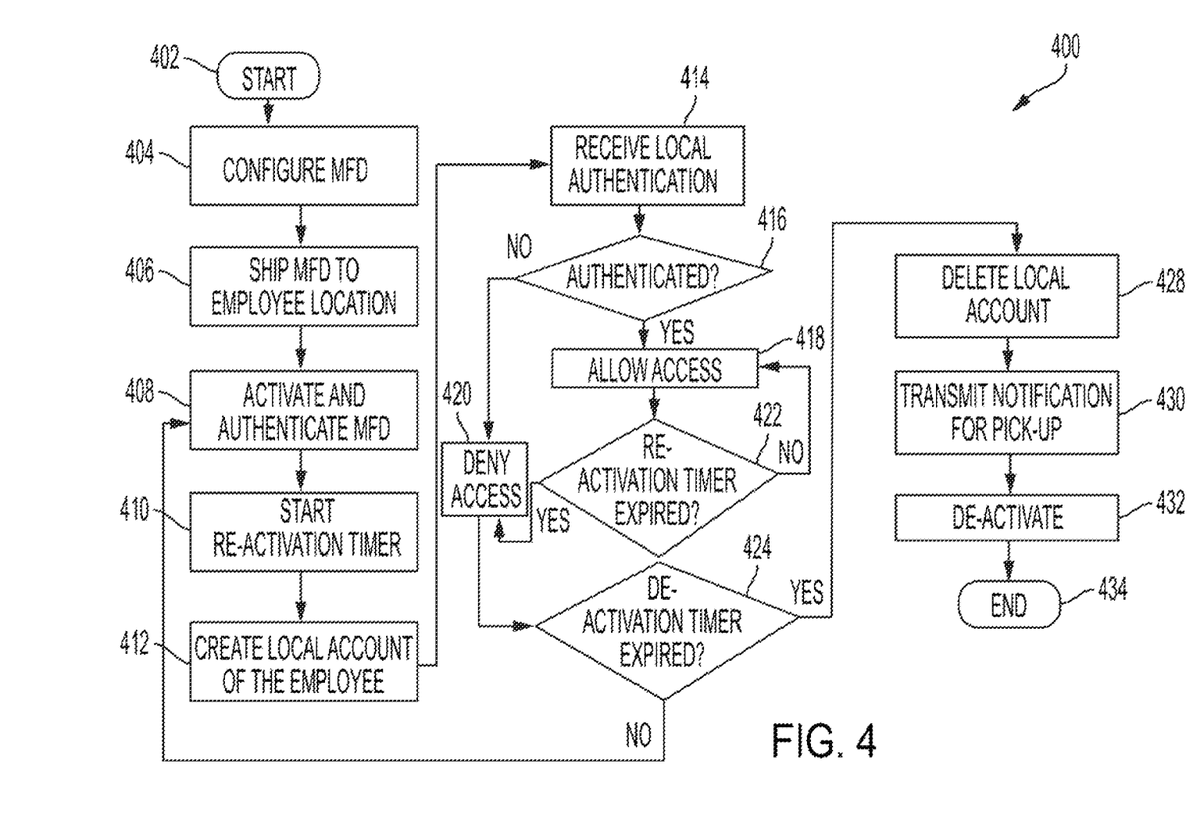
FIG. 4 illustrates a more detailed flow chart for a method of authenticating and controlling an enterprise owned MFD at an employee location of the present disclosure.

FIG. 4 illustrates a more detailed flow chart for a method 400 of authenticating and controlling an enterprise owned MFD at an employee location of the present disclosure. In one embodiment, the method 400 may be performed by the apparatus 102 or by an apparatus such as the apparatus 500 illustrated in FIG. 5 and discussed below.

In one embodiment, the method 400 begins at block 402. At block 404, the method 400 configures the enterprise owned MFD. For example, the enterprise may assign the MFD to be delivered to a particular employee at the home address of the employee. The enterprise may load a configuration file to enable the MFD to perform the remote authentication and perform the local self-management. The enterprise may also install a de-activation timer on the MFD and set the de-activation timer for the desired amount of time. The MFD may also be modified with a GPS radio to collect location information to confirm that the MFD has been delivered to the home address of the employee.

At block 406, the enterprise owned MFD may be shipped to the employee location. For example, the employee location may be the home of the employee that is located remotely from the office location of the enterprise.

At block 408, the employee may activate and authenticate the MFD once the MFD is delivered to the employee. For example, the employee may power on the MFD, execute the operating system software, make the wired or wireless connections to endpoint devices, the authentication server for authentication, and the like.

After the MFD is activated, the MFD may prompt the employee for the enterprise username and password. The employee may enter the enterprise username and password to be transmitted to the authentication server for authentication.

In one embodiment, the MFD may also transmit GPS location information obtained by the GPS radio or from the mobile endpoint device of the employee. The GPS location information may be transmitted to ensure that the GPS location information matches the stored GPS location information for the home address of the employee.

If the employee is authenticated, the authentication server may transmit a notification to the MFD that the employee is authenticated. The notification may also include an activation control signal to allow the MFD to operate.

At block 410, the MFD may start the re-activation timer. At block 412, the MFD may prompt the user to create a local account of the employee. As described above, the local account may allow the employee to customize how the employee would like to perform the local authentication. For example, the local account may simply be a local username and password or may store an authorization associated with a proximity card, a mobile endpoint device, and the like.

At block 414, the MFD may be ready for use and the MFD may receive a local authentication request. For example, the employee may provide the local authentication information to execute a job. The MFD may authenticate the employee locally without having to communicate with the authentication server.

At block 416, if the user is not authenticated, the method 400 may proceed to block 420. For example, an unauthorized family member may be trying to access the MFD for personal use. At block 420, the MFD may deny access.

However, if the user is authenticated, the method 400 may proceed to block 418. At block 418, the method 400 may provide access to the MFD. The employee may select the desired functions or workflows to execute the desired number of jobs. In one embodiment, usage information may be collected by the MFD to track the usage of the MFD by the employee. The usage information may be transmitted back to the authentication server and analyzed by the enterprise.

In some instances, if the MFD is being underutilized, the enterprise may suggest that the employee return the MFD. For example, it may be cheaper to simply reimburse the employee to go to a local vendor to pay per use of another MFD, or the enterprise may determine another employee has a greater need for the MFD, and so forth.

At block 422, the MFD determines if the re-activation timer has expired. If the re-activation timer has expired, the method 400 may proceed to block 420 where access is denied. If the re-activation timer has not expired, then the method 400 may return to block 418 and continue to allow the employee access to the MFD.

At block 424, the MFD may determine if the de-activation timer has expired. For example, the de-activation timer may have expired if the employee did not perform the re-authentication before the de-activation timer expired. If the answer to block 424 is no, the method 400 may return to block 408. The user may perform re-authentication of the MFD with the remote server and request additional time with the MFD.

If the answer to block 424 is yes, then the method 400 may proceed to block 428. For example, the re-activation timer and the de-activation timer may have expired, indicating that the employee is not using the MFD 102 or not using the MFD 102 regularly. At block 428, the MFD may delete all local accounts of the employee. The MFD may also delete any user customizations that were loaded on to the MFD.

At block 430, the MFD may transmit a notification for pick-up. For example, the notification may be sent to the authentication server to schedule a pick-up at the home address of the employee where the MFD was delivered.

At block 432, the MFD may be de-activated. For example, the MFD may deactivate itself until the enterprise receives the MFD. The enterprise may then activate the MFD and reconfigure the MFD to be delivered to another employee. At block 434, the method 400 ends.

Thus, the present disclosure allows an enterprise to modify an enterprise owned MFD to be used at a remote location (e.g., a home of an employee). The enterprise owned MFD may be remotely authenticated, and account management may be performed locally. The account management may prevent users other than the employee from accessing the enterprise owned MFD. In addition, the enterprise owned MFD may be modified to limit an amount of time that the MFD is at the remote location and to ensure that the enterprise owned MFD is picked up and returned back to the enterprise after a predefined amount of time tracked by the de-activation timer. As a result, enterprises are provided with a way to control use of enterprise owned MFDs that are provided to employees who may be working remotely.

Figure 5:
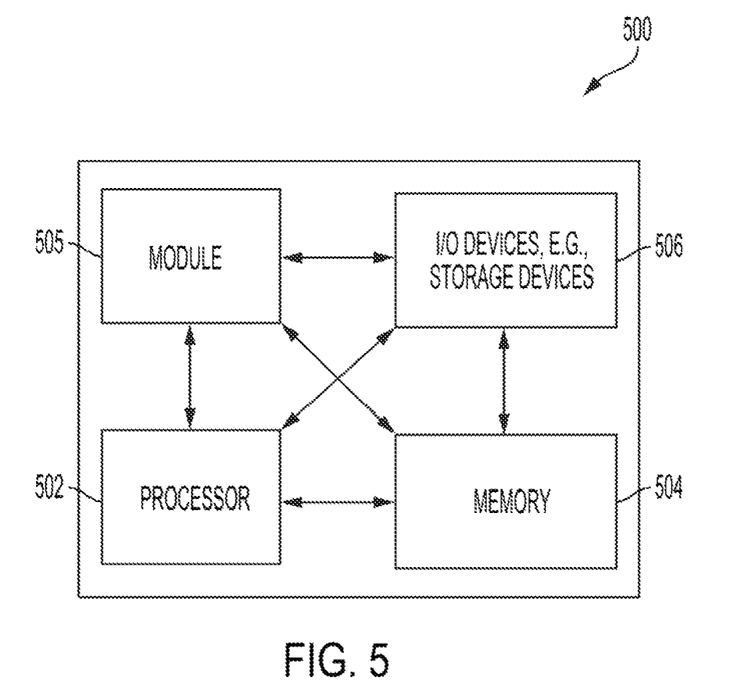
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for authenticating and controlling an enterprise owned MFD at an employee location, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for authenticating and controlling an enterprise owned MFD at an employee location (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for authenticating and controlling an enterprise owned MFD at an employee location (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An enterprise owned multi-function device (MFD), comprising:
a communication interface to establish a communication session with an authentication server;
a re-activation timer;
a processor; and
a non-transitory computer readable medium storing instructions which, when executed by the processor, cause the processor to:
authenticate the enterprise owned MFD by transmitting an employee username, a password and a global positioning system (GPS) location of the enterprise owned MFD to the authentication server over the communication session when the enterprise owned MFD is activated at a remote location of an employee;
activate the re-activation timer for a time limit for allowing an access to the enterprise owned MFD by the employee;
create a local account of the employee for a local authentication; and
authorize the access to the employee via the local account of the employee until the time limit of the re-activation timer expires.

2. The enterprise owned MFD of claim 1, wherein the processor is further to:
transmit a notification to the authentication server when the enterprise owned MFD is activated and authenticated.

3. The enterprise owned MFD of claim 1, wherein the time limit of the re-activation timer is to begin when the enterprise owned MFD is activated and authenticated.

4. The enterprise owned MFD of claim 1, wherein the local account comprises a local username and a password.

5. The enterprise owned MFD of claim 1, wherein the local account comprises an authorization associated with a proximity card of the employee.

6. The enterprise owned MFD of claim 1, wherein the local account comprises an authorization associated with a mobile endpoint device of the employee.

7. The enterprise owned MFD of claim 1, further comprises:

a de-activation timer having a second time limit that begins when the time limit of the re-activation timer expires, wherein the processor is further to:
determine an expiration of the second time limit of the de-activation timer.

8. The enterprise owned MFD of claim 7, wherein the processor is further to:
delete the local account of the employee from the enterprise owned MFD in response to the expiration of the second time limit of the de-activation timer; and
transmit a notification to the authentication server to schedule a pick-up of the enterprise owned MFD from the remote location of the employee.

9. The enterprise owned MFD of claim 7, wherein the processor is further to:
receive a request from the employee to restart the time limit of the re-activation timer; and
restart the time limit of the re-activation timer in response to the request.

10. The enterprise owned MFD of claim 1, wherein the processor is further to:
configure the enterprise owned MFD with customizations associated with the employee in response to the enterprise owned MFD being activated and authenticated.

11. A method, comprising:
detecting, via a processor of an enterprise owned multi-function device (MFD), an activation of the enterprise owned MFD;
transmitting, via the processor, a request comprising an employee username, a password and a global positioning system (GPS) location of the enterprise owned MFD to an authentication server for authentication of an employee in response to the activation;
receiving, via the processor, a confirmation of authentication of the employee from the authentication server;
activating a re-activation timer for a time limit for allowing an access to the enterprise owned MFD by the employee;
creating, via the processor, a local account of the employee for a local authentication; and
authorizing, via the processor, the access of the enterprise owned MFD to the employee via the local account of the employee until the time limit of the re-activation timer expires.

12. The method of claim 11, further comprising:
transmitting, via the processor, a notification to the authentication server when the enterprise owned MFD is activated and authenticated.

13. The method of claim 11, further comprising:
starting, via the processor, the time limit of the re-activation timer when the enterprise owned MFD is activated and authenticated.

14. The method of claim 11, wherein the local account comprises a local username and a password.

15. The method of claim 11, wherein the local account comprises an authorization associated with a proximity card of the employee.

16. The method of claim 11, wherein the local account comprises an authorization associated with a mobile endpoint device of the employee.

17. The method of claim 11, further comprising:
starting, via the processor, a second time limit of a de-activation timer in response to the time limit of the re-activation timer expiring;
determining, via the processor, that the second time limit of the de-activation timer has expired;
deleting, via the processor, the local account of the employee from the enterprise owned MFD in response to the determining that the second time limit of the de-activation timer has expired; and
transmitting, via the processor, a notification to the authentication server to schedule a pick-up of the enterprise owned MFD from a remote location of the employee.

18. The method of claim 11, further comprising:
starting, via the processor, a second time limit of a de-activation timer in response to the time limit of the re-activation timer expiring;
executing, via the processor, a re-authentication before an expiration of the second time limit of the de-activation timer; and
restarting, via the processor, the time limit of the re-activation timer in response to a successful re-authentication of the enterprise owned MFD.

19. The method of claim 11, further comprising:
configuring, via the processor, the enterprise owned MFD with customizations associated with the employee in response to the enterprise owned MFD being activated and authenticated.

20. An enterprise owned multi-function device (MFD), comprising:
a communication interface to establish a communication session with an authentication server;
a re-activation timer;
a global positioning system (GPS) radio to determine a current location of the enterprise owned MFD;
a processor; and
a non-transitory computer readable medium storing instructions which, when executed by the processor, cause the processor to:
transmit an employee username, a password and a GPS location of the enterprise owned MFD to the authentication server over the communication session to authenticate the enterprise owned MFD when the enterprise owned MFD is activated at a remote location of an employee;
activate the re-activation timer for a time limit for allowing an access to the enterprise owned MFD by the employee upon receiving a confirmation of authentication of the employee from the authentication server;
create a local account of the employee for a local authentication; and
authorize access to the employee via the local account of the employee until the time limit of the re-activation timer expires.

* * * * *